United States Patent
Kato et al.

(10) Patent No.: US 10,381,677 B2
(45) Date of Patent: Aug. 13, 2019

(54) SECONDARY BATTERY

(71) Applicant: TOYOTA JIDOSHA KABUSHIKI KAISHA, Toyota-shi, Aichi-ken (JP)

(72) Inventors: Masashi Kato, Konan (JP); Mizuho Matsumoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 666 days.

(21) Appl. No.: 15/016,819

(22) Filed: Feb. 5, 2016

(65) Prior Publication Data

US 2016/0233540 A1    Aug. 11, 2016

(30) Foreign Application Priority Data

Feb. 9, 2015 (JP) .................. 2015-023630

(51) Int. Cl.
*H01M 2/02* (2006.01)
*H01M 10/04* (2006.01)
*H01M 2/04* (2006.01)
*H01M 2/06* (2006.01)
*H01M 2/30* (2006.01)
*H01M 10/0587* (2010.01)
*H01M 2/10* (2006.01)

(52) U.S. Cl.
CPC ....... *H01M 10/0431* (2013.01); *H01M 2/024* (2013.01); *H01M 2/0217* (2013.01); *H01M 2/0262* (2013.01); *H01M 2/0277* (2013.01); *H01M 2/043* (2013.01); *H01M 2/0404* (2013.01); *H01M 2/06* (2013.01); *H01M 2/30* (2013.01); *H01M 10/0587* (2013.01); *H01M 2/022* (2013.01); *H01M 2/046* (2013.01); *H01M 2/0417* (2013.01); *H01M 2/0473* (2013.01); *H01M 2/1061* (2013.01)

(58) Field of Classification Search
CPC ................................. H01M 2/0417
See application file for complete search history.

(56) References Cited

U.S. PATENT DOCUMENTS

| 2003/0203280 A1 | 10/2003 | Hamada et al. | |
|---|---|---|---|
| 2004/0131932 A1* | 7/2004 | Hamada | H01M 2/0202 429/175 |
| 2012/0088147 A1* | 4/2012 | Moon | H01M 2/0217 429/179 |

FOREIGN PATENT DOCUMENTS

| JP | 11339757 A | 12/1999 |
|---|---|---|
| JP | 2000040501 A | 2/2000 |
| JP | 2002-42773 A | 2/2002 |
| JP | 2003-317697 A | 11/2003 |
| JP | 2004-111308 A | 4/2004 |

(Continued)

*Primary Examiner* — Jeremiah R Smith
(74) *Attorney, Agent, or Firm* — Sughrue Mion, PLLC

(57) ABSTRACT

A secondary battery includes a rolled electrode body, a case main body that has a shape of an open cylinder with a bottom; a case cover, a first electrode terminal, and a second electrode terminal. The first electrode terminal and the second electrode terminal support the rolled electrode body. The first electrode terminal is fixed to the case cover, with one end being exposed to the outside of the case main body, and the other end being connected to a first collector portion. The second electrode terminal is fixed, together with the negative-electrode electrode terminal, to the case cover, with one end being exposed to the outside of the case main body, and the other end being connected to a second collector portion.

4 Claims, 13 Drawing Sheets

(56) References Cited

FOREIGN PATENT DOCUMENTS

| JP | 2011-054378 A | 3/2011 |
| JP | 2013097988 A | 5/2013 |
| JP | 2014-167890 A | 9/2014 |

\* cited by examiner

SECONDARY BATTERY

INCORPORATION BY REFERENCE

The disclosure of Japanese Patent Application No. 2015-023630 filed on Feb. 9, 2015 including the specification, drawings and abstract is incorporated herein by reference in its entirety.

BACKGROUND OF THE INVENTION

1. Field of the Invention

The invention relates to a secondary battery. More particularly, the invention relates to a secondary battery that includes a rolled electrode body in which a positive electrode sheet and a negative electrode sheet are rolled with a separator sandwiched therebetween.

2. Description of Related Art

There are two types of secondary batteries that include a rolled electrode body; one in which the rolled electrode body is housed vertically in a case main body and one in which the rolled electrode body is housed horizontally in the case main body. In this case, the term "vertically" refers to the rolled electrode body being housed in the case main body such that a rolling axis is perpendicular to a bottom surface of the case main body that has a shape of an open cylinder with a bottom, and the term "horizontally" refers to the rolled electrode body being housed in the case main body such that the rolling axis is parallel to the bottom surface. In this specification, the battery of the type in which the rolled electrode body is housed vertically in the case main body will be referred to as a "vertical battery" to simplify the description. Also, the cylindrical main body having a shape of an open cylinder with a bottom, together with a case cover that closes off the opening of the case main body, will be referred to as a "battery case".

With many vertical batteries, an electrode terminal of one of a positive electrode and a negative electrode is provided on the case cover, and the other electrode terminal is provided on a bottom plate of the battery case (Japanese Patent Application Publication No. 2011-054378 (JP 2011-054378 A), Japanese Patent Application Publication No. 2003-317697 (JP 2003-317697 A), and Japanese Patent Application Publication No. 2004-111308 (JP 2004-111308 A)). This is done for the following reason. One typical structure of a rolled electrode body has a positive electrode collector portion in which only the positive electrode sheet is exposed, provided on one end in the rolling direction, and has a negative electrode collector portion in which only the negative sheet is exposed, provided on the other end. When this kind of rolled electrode body is employed in a vertical battery, the electrode terminals are provided near the collector portions, i.e., one electrode terminal is provided on each of the case cover and the bottom plate, so the structure of the battery is simple.

However, when a vertical battery is employed, the electrode terminals of the positive electrode and the negative electrode are divided between the case cover and the bottom plate, which makes them difficult to use. Japanese Patent Application Publication No. 2014-167890 (JP 2014-167890 A) describes a vertical type battery in which the electrode terminals of the positive and negative electrodes are both provided on the case cover. In this secondary battery, the structure of the rolled electrode body is designed differently. In this secondary battery, a plurality of strips of conductive tape referred to as "tabs" are adhered to both the positive sheet and the negative sheet of the rolled electrode body. The tabs of the positive electrode sheet and the negative electrode sheet are both adhered so as to protrude on the case cover side of the rolled electrode body that is vertically housed in the case. The plurality of taps of the positive electrode sheet are bundled together on the cover case side of the rolled electrode body and connected to the electrode terminal of the positive electrode. Similarly, the plurality of taps of the negative electrode sheet are bundled together on the cover case side of the rolled electrode body and connected to the electrode terminal of the negative electrode. Instead of the plurality of tabs, a plurality of protruding portions that protrude in the short direction may also be provided on each of the positive electrode sheet and the negative electrode sheet that are strip-like.

SUMMARY OF THE INVENTION

The rigidity of the tabs, i.e., the strips of conductive tape, described above is not high. Even if the protruding portions are used instead of the tabs, the rigidity of the protruding portions that are parts of the positive electrode sheet and the negative electrode sheet is also not high. Therefore, with the secondary battery described in JP 2014-167890 A, the rolled electrode body is maintained in a state hanging down from the case cover. With this kind of secondary battery, in the assembly process, if the rolled electrode body hits an edge of the opening of the case main body when the rolled electrode body that is hanging from the case cover is inserted into the case main body, the rolled electrode body will end up swinging, and as a result, the rolled electrode body is unable to be smoothly put into the case main body. The invention was created in view of this problem. The technology described in this specification provides an easily assembled structure related to a vertical type of secondary battery that has the electrode terminals of the positive electrode and the negative electrode provided on the case cover.

One aspect of the invention relates to a secondary battery that includes a rolled electrode body, a case main body that has a shape of an open cylinder with a bottom, a first electrode terminal, and a second electrode terminal. The rolled electrode body includes a positive electrode sheet, a negative electrode sheet, a separator, a positive electrode collector portion, and a negative electrode collector portion. The positive electrode sheet and the negative electrode sheet are rolled with the separator sandwiched therebetween. The positive electrode collector portion is formed on one end in a direction of a rolling axis, and the negative electrode collector portion is formed on the other end in the direction of the rolling axis. The case main body that has a shape of an open cylinder with a bottom houses the rolled electrode body in an orientation in which the rolling axis is orthogonal to a bottom surface. A case cover closes off an upper opening of the case main body. The first electrode terminal is fixed to the case cover, with one end of the first electrode terminal being exposed to an outside of the case main body, and the other end of the first electrode terminal being connected to a first collector portion. The first collector portion is one of the positive electrode collector portion and the negative electrode collector portion, whichever is positioned on an upper side of the rolled electrode body inside the case main body. The second electrode terminal is fixed, together with the first electrode terminal, to the case cover, one end of the second electrode terminal being exposed to the outside of the case main body, and the other end of the second electrode terminal being connected to a second collector portion. The second collector portion is one of the positive electrode collector portion and the negative electrode collector portion, whichever is positioned on a lower side of the rolled electrode body. The first electrode terminal and the second electrode terminal support the rolled electrode body.

In the aspect described above, the second electrode terminal may include a vertical support plate and a horizontal support plate. The vertical support plate may extend toward the bottom surface of the case main body along the rolled electrode body. The horizontal support plate may be connected to a lower end of the vertical support plate. The second collector portion may be fixed on top of the horizontal support plate.

In the aspect described above, in the second collector portion, an edge of one sheet, from among the positive electrode sheet and the negative electrode sheet, may be exposed, and the edge of the one sheet may be joined to the horizontal support plate.

In the aspect described above, the vertical support plate may be inserted through an inside of the rolled electrode body.

In the aspect described above, a pair of the vertical support plates may extend toward the bottom surface of the case main body, sandwiching the rolled electrode body from both sides.

In the aspect described above, the rolled electrode body may be rolled flat having a portion where the positive electrode sheet, the negative electrode sheet, and the separator extend linearly, and a portion where the positive electrode sheet, the negative electrode sheet, and the separator are curved, when viewed from the rolling axis direction. The horizontal support plate may be connected to only one side of the portion that extends linearly, with a long axis of the flat rolled electrode body as a boundary, when viewed from the rolling axis direction.

In the aspect described above, the case main body and the case cover may be insulating bodies, or the case main body and the case cover may be insulated from the rolled electrode body.

According to the aspect described above, the rolled electrode body is supported from above and below by the first electrode terminal and the second electrode terminal that are both fixed to the case cover. Therefore, the rolled electrode body is able to be inserted into the case main body, without the rolled electrode body swinging, when housing the rolled electrode body in the case main body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1:
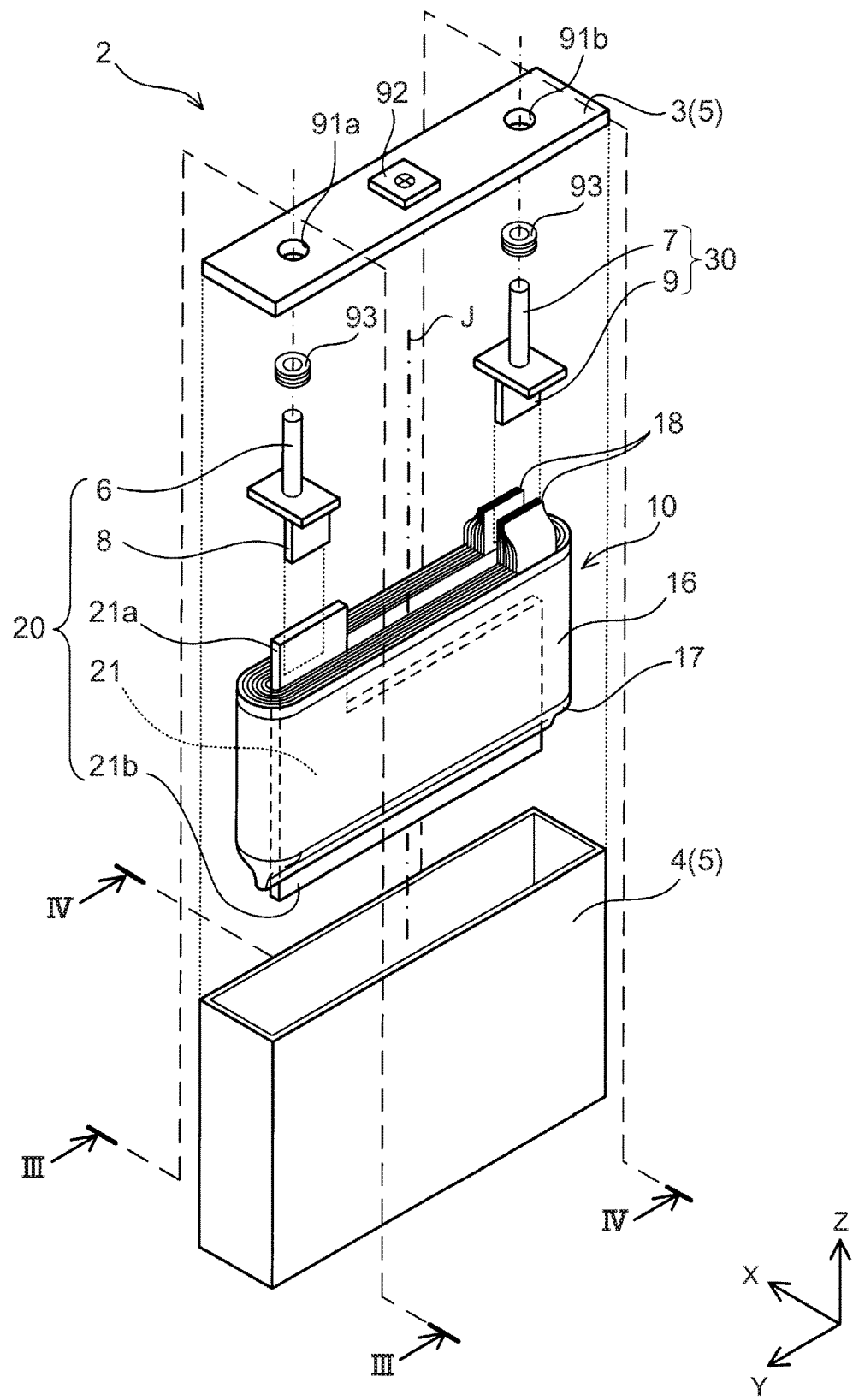
FIG. 1 is an exploded perspective view of a secondary battery according to a first example embodiment of the invention.

A secondary battery according to a first example embodiment will now be described with reference to the accompanying drawings. FIG. 1 is an exploded perspective view of the secondary battery 2 according to the first example embodiment. The secondary battery of this example embodiment is a non-aqueous electrolyte secondary battery in which a rolled electrode body 10, described later, is housed in a flat rectangular-shaped battery case 5 filled with electrolyte. More specifically, the secondary battery 2 is a rectangular sealed lithium-ion battery. Hereinafter, the secondary battery 2 may be referred to simply as "battery 2" to simplify the description. Also, to simplify the description, the positive direction along the Z axis in the drawings will be referred to as "up", and the negative direction along the Z axis in the drawings will be referred to as "down".

As described earlier, the battery 2 is a device in which the rolled electrode body 10 and electrolyte are housed in the battery case 5. The battery case 5 is formed by a case main body 4 and a case cover 3. The case main body 4 is formed in a flat rectangular open cylinder with a bottom, in which a length in a short direction (the X axis direction on the coordinate system in the drawings) is significantly shorter than a length in a long direction (the Y axis direction in the drawings). The rolled electrode body 10 and the electrolyte are housed in this case main body 4, and the case cover 3 closes off an upper opening of the case main body 4. The case main body 4 and the case cover 3 are made of aluminum.

Through-holes 91a and 91b are formed one in each end of the case cover 3 in the long direction. A positive electrode exposed portion 6 of a positive-electrode electrode terminal 20 is inserted through one of the through-holes 91a via an insulating gasket 93. The positive-electrode electrode terminal 20 is made of conductive metal. More specifically, the positive-electrode electrode terminal 20 is made of copper. The positive electrode exposed portion 6 of an upper portion of the positive-electrode electrode terminal 20 is exposed to the outside of the case main body 4, and the portion of the positive-electrode electrode terminal 20 excluding the positive electrode exposed portion 6 is positioned inside the case. The insulating gasket 93 seals between the positive-electrode electrode terminal 20 (i.e., the positive electrode exposed portion 6) and the through-hole 91a, and insulates the positive-electrode electrode terminal 20 from the case cover 3. A negative electrode exposed portion 7 of a negative-electrode electrode terminal 30 is inserted through the other through-hole 91b via an insulating gasket 93. The negative-electrode electrode terminal 30 is made of conductive metal, more specifically, copper. The negative electrode exposed portion 7 of an upper portion of the negative-electrode electrode terminal 30 is exposed to the outside of the case main body 4, and a connecting portion 9 that is connected to a lower end of the negative electrode exposed portion 7 is positioned inside the case main body 4. The insulating gasket 93 seals between the negative-electrode electrode terminal 30 and the through-hole 91b, and insulates the negative-electrode electrode terminal 30 from the case cover 3.

A safety valve 92 that opens when the internal pressure of the battery case 5 rises equal to or above a predetermined threshold value is provided in the center of the case cover 3 in the long direction.

Figure 2:
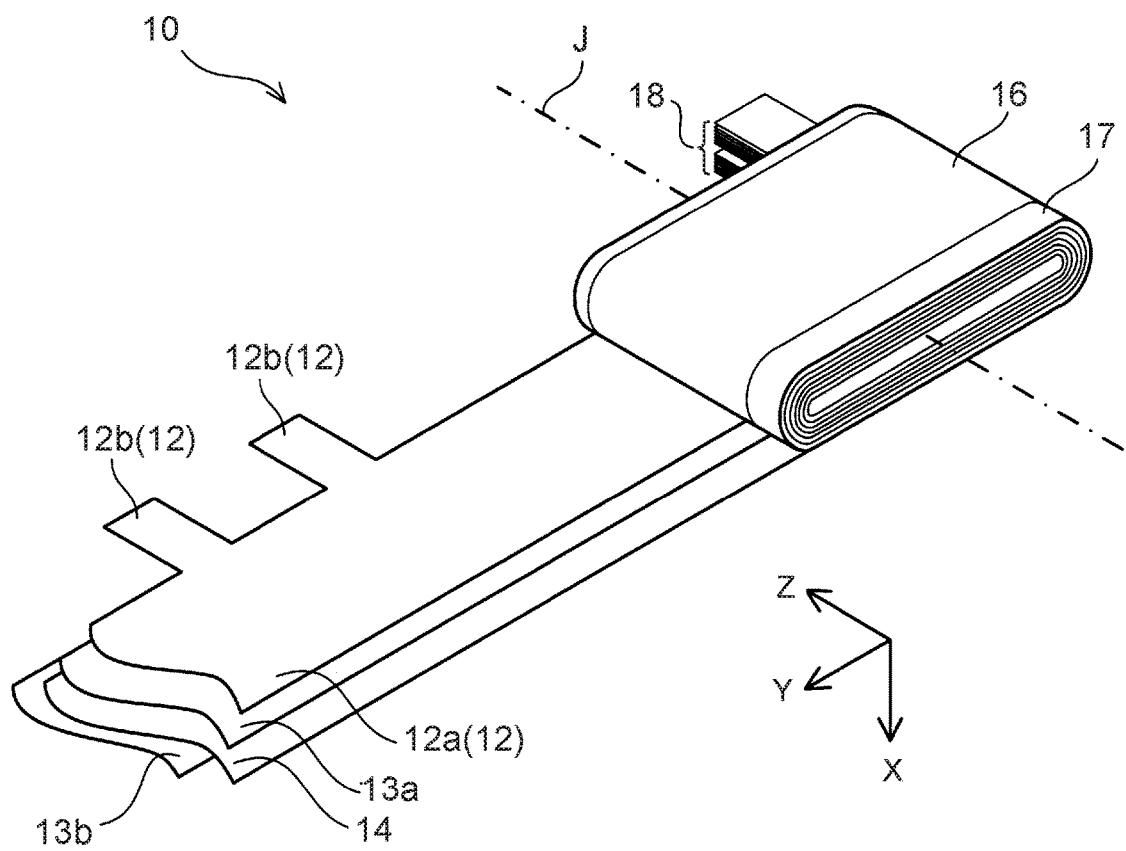
FIG. 2 is a perspective view of a rolled electrode body.

An electrode body that is rolled in a flat shape (i.e., the rolled electrode body 10) is housed inside the case main body 4, and electrolyte that the housed rolled electrode body 10 is immersed in is filled into the case main body 4. FIG. 2 is a perspective view of the rolled electrode body 10. FIG. 2 is a view showing a portion of the rolled electrode body 10 unrolled. As shown in FIG. 2, the rolled electrode body 10 is an electrode body in which a positive electrode sheet 14 having a positive electrode active material layer and a negative electrode sheet 12 having a negative electrode active material layer are rolled, with separators 13a and 13b therebetween, in a flat shape. The positive electrode sheet 14 and the negative electrode sheet 12 are rolled offset a predetermined distance from each other in the direction in which the rolling axis J extends. In the Z axis negative direction (i.e., the downward direction) on the coordinate system in the drawing, there is a portion where only the positive electrode sheet 14 is rolled. This portion will be referred to as a positive electrode collector portion 17. A plurality of protruding portions 12b are formed on the negative electrode sheet 12. Each protruding portion 12b is formed protruding upward (in the Z axis positive direction) of the rolled electrode body 10 from a main body portion 12a of the negative electrode sheet 12 that extends in a strip shape in the Y axis direction in the drawing. The plurality of protruding portions 12b are provided on the main body portion 12a of the negative electrode sheet 12 at equal pitches so as to overlap with each other when the positive electrode sheet 14, the negative electrode sheet 12, and the separators 13a and 13b are rolled. A group of these protruding portions 12b that are overlapped in the rolled electrode body 10 corresponds to a negative electrode collector portion 18. A portion of the rolled electrode body 10 where all of the positive electrode sheet 14, the negative electrode sheet 12, and the separators 13a and 13b overlap is a portion where electricity is generated, and will be referred to as a "power generating portion 16".

The rolled electrode body 10 is housed in the case main body 4 such that the rolling axis J thereof is perpendicular to a bottom surface of the case main body 4. This orientation of the rolled electrode body 10 with respect to the case main body 4 will be referred to as "vertical". The rolled electrode body 10 is housed in the case main body 4 such that the negative electrode collector portion 18 that is formed by the plurality of protruding portions 12b is positioned on the upper side, i.e., the side with the case cover 3. The connecting portion 9 of the negative-electrode electrode terminal 30 is welded to the negative electrode collector portion 18. The negative electrode exposed portion 7 is continuous with an upper end of the connecting portion 9.

Now the positive-electrode electrode terminal 20 will be described. The positive-electrode electrode terminal 20 includes the positive electrode exposed portion 6 that is exposed to the outside of the case main body 4 and is fixed to the case cover 3 via the insulating gasket 93, a connecting portion 8 that is continuous with a lower end of the positive electrode exposed portion 6, and a vertical support plate 21 that is joined to the connecting portion 8. The vertical support plate 21 is inserted into the center of the rolled electrode body 10 so as to pass through the long axis of the flat rolled electrode body 10. The vertical support plate 21 is inserted into a portion occupied by the rolling core when the positive electrode sheet 14, the negative electrode sheet 12, and the separators 13a and 13b are rolled. An upper portion 21a of the vertical support plate 21 is welded to the connecting portion 8. An upper end of the connecting portion 8 is welded to the positive electrode exposed portion 6. Also, the positive electrode collector portion 17 where only the positive electrode sheet 14 is layered is welded to a lower portion 21b of the vertical support plate 21.

Figure 3:
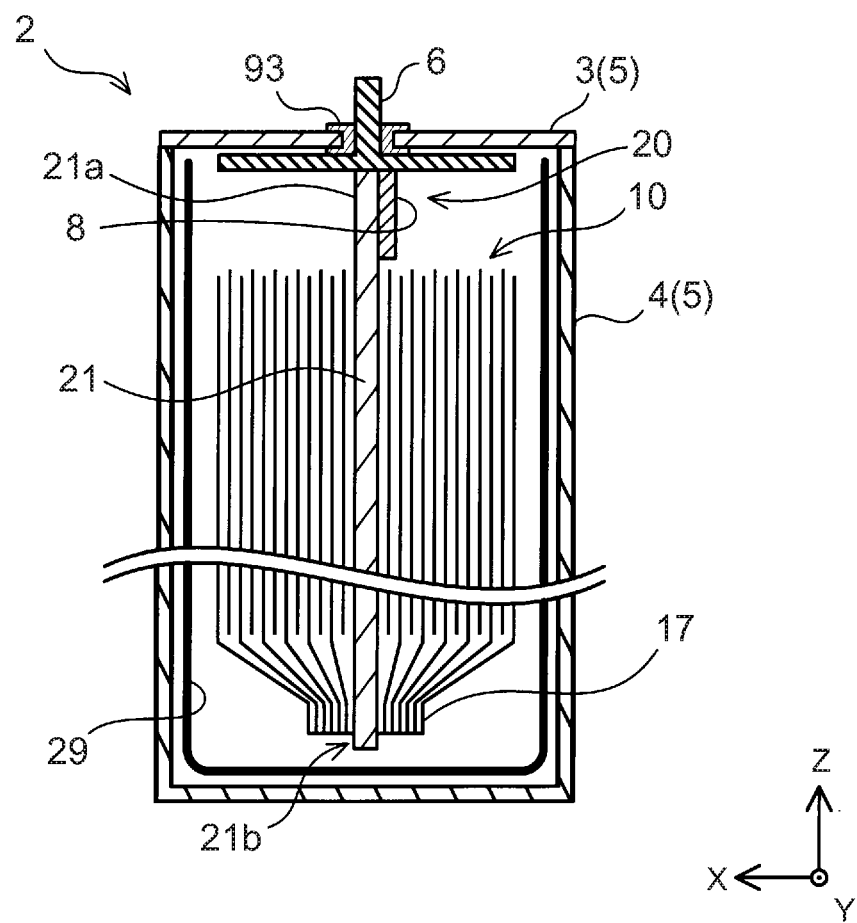
FIG. 3 is a sectional view taken along line III-III in FIG. 1.
Figure 4:
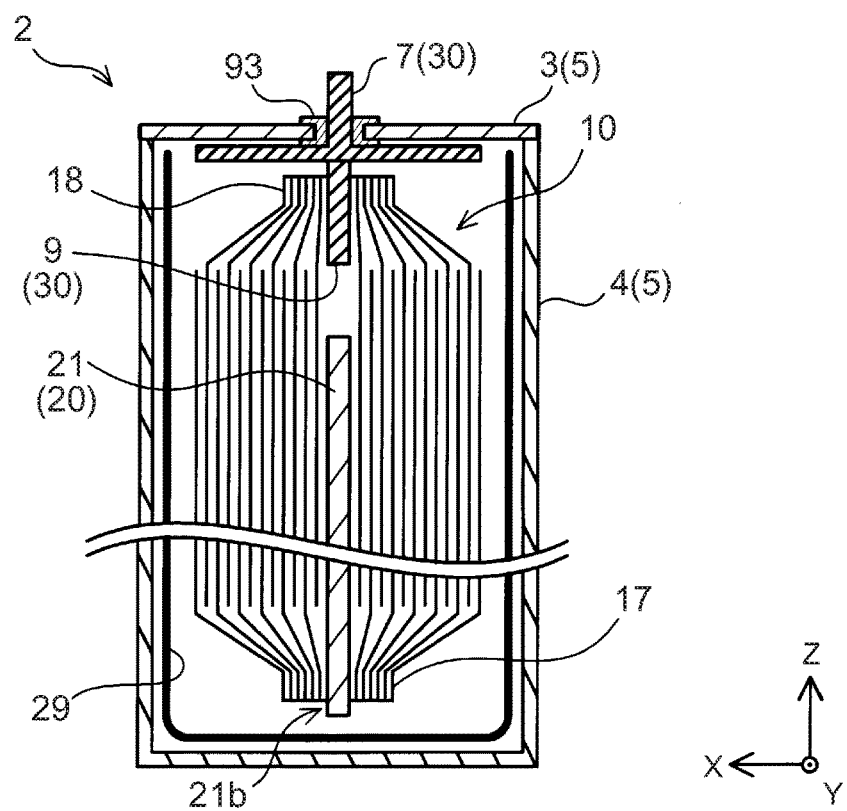
FIG. 4 is a sectional view taken along line IV-IV in FIG. 1.

Now the description will be continued with reference to FIGS. 3 and 4, in addition to FIG. 1. FIG. 3 is a sectional view taken along line III-III in FIG. 1, and FIG. 4 is a sectional view taken along line IV-IV in FIG. 1. FIGS. 3 and 4 are views of a cross-section of the rolled electrode body 10, with the separators omitted from these cross-sections. As shown in FIG. 3, a lower side of the rolled electrode body 10, i.e., the positive electrode collector portion 17, is supported by the positive-electrode electrode terminal 20, and this positive-electrode electrode terminal 20 is supported by the case cover 3 via the insulating gasket 93, so ultimately, the positive electrode collector portion 17 that is positioned on the lower side of the rolled electrode body 10 is supported by the case cover 3.

Also, as shown in FIG. 4, an upper side of the rolled electrode body 10, i.e., the negative electrode collector portion 18, is supported by the negative-electrode electrode terminal 30, and this negative-electrode electrode terminal 30 is supported by the case cover 3 via the insulating gasket 93, so ultimately, the negative electrode collector portion 18 that is positioned on the upper side of the rolled electrode body 10 is supported by the case cover 3.

At the same time, the positive electrode collector portion 17 and the positive-electrode electrode terminal 20 are electrically connected together, and the negative electrode collector portion 18 and the negative-electrode electrode terminal 30 are electrically connected together. As is well shown in FIG. 4, the positive electrode collector portion 17, i.e., the rolled and overlapped positive electrode sheet 14, is gathered toward the vertical support plate 21, and welded to the vertical support plate 21. Similarly, the negative electrode collector portion 18, i.e., the plurality of protruding portions 12b of the negative electrode sheet 12, is gathered toward the connecting portion 9, and welded to the connecting portion 9. Electricity flows through these welded locations. Spot welding may be employed for the welding.

As shown in FIGS. 3 and 4, the upper and lower portions of the rolled electrode body 10 are supported by the negative-electrode electrode terminal 30 and the positive-electrode electrode terminal 20. In particular, the positive-electrode electrode terminal 20 and the negative-electrode electrode terminal 30 are metal rigid bodies that securely support the rolled electrode body 10. Furthermore, the vertical support plate 21 that is a portion of the positive-electrode electrode terminal 20 is joined to the lower end (i.e., the positive electrode collector portion 17) of the rolled electrode body 10. Therefore, when housing the rolled electrode body 10 in the case main body 4 in the manufacturing process, the rolled electrode body 10 is able to be smoothly housed in the case main body 4 without the rolled electrode body 10 swinging even if the rolled electrode body 10 contacts the case main body 4. The rolled electrode body 10 is supported so as to be pulled up and down by the negative-electrode electrode terminal 30 and the positive-electrode electrode terminal 20. Each one of the protruding portions 12b that form the negative electrode collector portion 18 is thin and flexible, and the positive electrode sheet 14 that forms the positive electrode collector portion 17 is also thin and flexible. Therefore, the negative electrode collector portion 18 and the positive electrode collector portion 17 both easily deform in the compression direction. However, the rolled electrode body 10 is supported while both ends are pulled in opposite directions in the direction of the rolling axis (i.e., the up and down direction), so the rolled electrode body 10 will not easily get out of position in either the up or down direction. Moreover, the rolled electrode body 10 is supported while being pulled up and down, and thus will not be easily offset in either the X-axis direction or the Y-axis direction in the drawings.

Having the rolled electrode body 10 be securely supported by the negative-electrode electrode terminal 30 and the positive-electrode electrode terminal 20 inside the battery case 5 is also advantageous when the battery 2 is used in a vibration environment. That is, the negative-electrode electrode terminal 30 and the positive-electrode electrode terminal 20 also prevent the rolled electrode body 10 from swinging inside the battery case 5.

An insulting sheet 29 is arranged inside the case main body 4. This insulting sheet 29 insulates the rolled electrode body 10 from the case main body 4.

Here, the advantages of housing the rolled electrode body 10 vertically in the case main body 4 will be described. In a sealed non-aqueous electrolyte secondary battery, the internal pressure may rise due to the electrolyte inside vaporizing or the like. Therefore, the battery case 5 is provided with a safety valve 92 that opens when the internal pressure exceeds a predetermined threshold value. The temperature at the center portion of the rolled electrode body 10 tends to be higher than the temperature at the peripheral edge portion of the rolled electrode body 10, so electrolyte vaporizes at the center portion of the rolled electrode body 10. The vaporized electrolyte moves along the rolling axis J. As shown in FIG. 1, in the vertical battery 2, the safety valve 92 is provided in the direction in which the rolling axis J extends. Therefore, when the safety valve 92 opens, gas inside the case is smoothly released outside the case.

Figure 5:
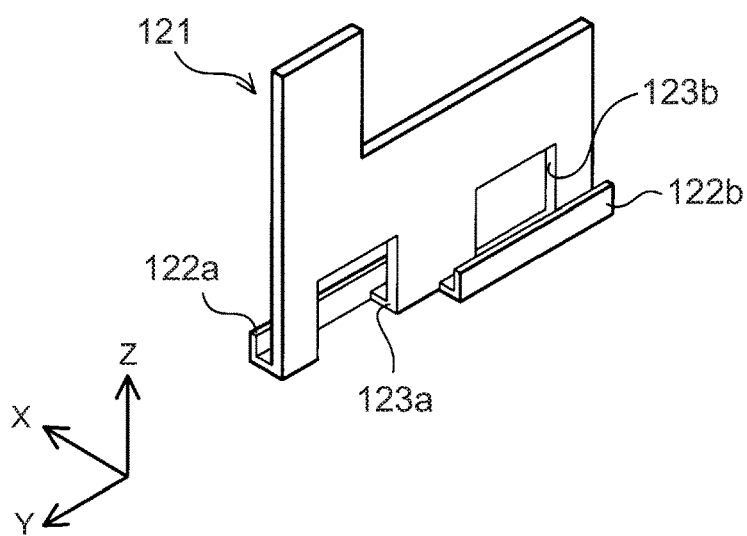
FIG. 5 is a perspective view of a vertical support plate of a battery according to a first modified example of the first example embodiment.
Figure 6:
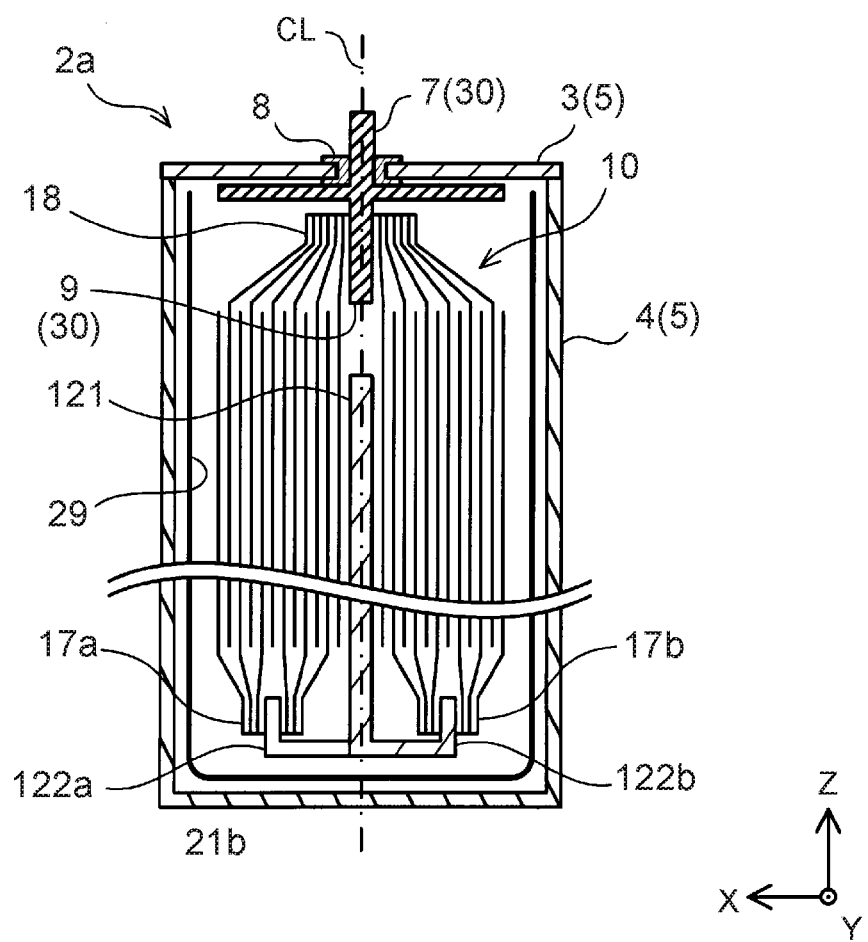
FIG. 6 is a sectional view of the battery according to the first modified example of the first example embodiment.

Next, a modified example of the battery 2 will be described. In this modified example, the structure of the vertical support plate differs from that in the example embodiment above. FIG. 5 is a perspective view of a vertical support plate 121 according to the modified example, and FIG. 6 is a sectional view of a battery 2a according to the modified example. The sectional view in FIG. 6 corresponds to the sectional view in FIG. 4 of the first example embodiment.

In this modified example, a lower portion of the vertical support plate 121 is divided into left and right forks, as shown in FIG. 5. One-half of a front side (the Y axis negative direction) in the long direction (the Y axis direction in the drawing) of the lower portion of the vertical support plate 121 is bent at a right angle toward the left side (the X axis positive direction) in the drawing, and one-half of the lower portion of the vertical support plate 121 on a rear side (the Y axis negative direction) is bent at a right angle toward the right side (the X axis negative direction) in the drawing. To simplify the description, the portion that is bent to left will be referred to as a "left horizontal support plate 122a", and the portion that is bent to the right will be referred to as a "right horizontal support plate 122b". A tip end of both the left horizontal support plate 122a and the right horizontal support plate 122b is bent upward at a right angle. As shown in FIG. 6, a positive electrode collector portion 17a that is positioned to the left of a center line CL is welded to the tip end of the left horizontal support plate 122a, and a positive electrode collector portion 17b that is positioned to the right of the center line CL is welded to the tip end of the right horizontal support plate 122b. With the battery 2a of this modified example, the positive electrode collector portions 17a and 17b are welded to the horizontal support plates at two locations, i.e., the left horizontal support plate 122a and the right horizontal support plate 122b. With this battery 2a, the number of positive electrode sheets that are overlapped and welded is reduced, so the internal resistance at the welds points is able to be reduced.

As shown in FIG. 5, the vertical support plate 121 has an opening 123a that is provided in a position facing the tip end of the left horizontal support plate 122a that is bent at a right angle, and an opening 123b that is provided in a position facing the tip end of the right horizontal support plate 122b that is bent at a right angle. These openings 123a and 123b are provided for inserting a tip end of a welder when spot welding the positive electrode collector portions 17a and 17b to the tip ends of the horizontal support plates 122a and 122b.

Second Example Embodiment

Figure 7:
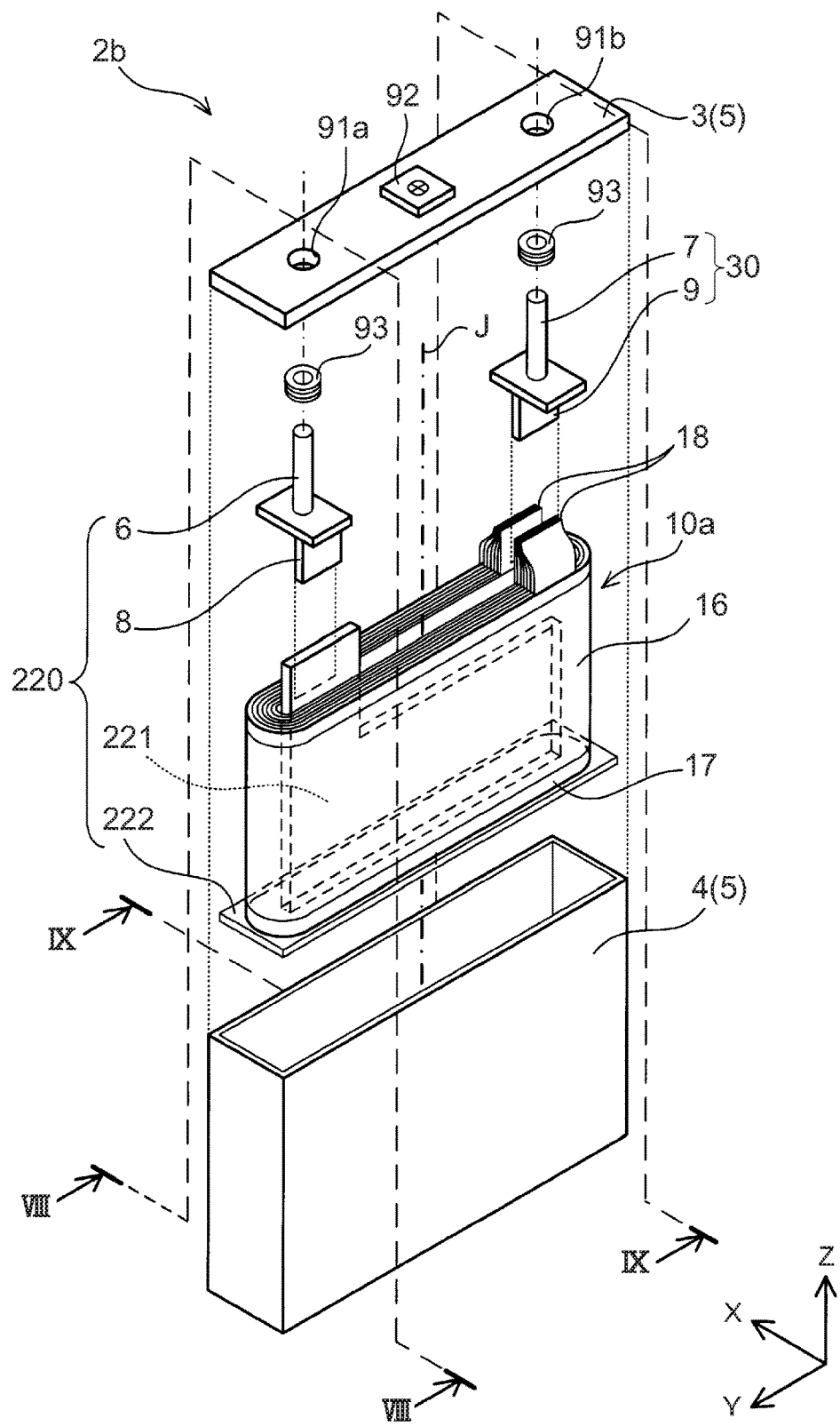
FIG. 7 is an exploded perspective view of a secondary battery according to a second example embodiment of the invention.
Figure 8:
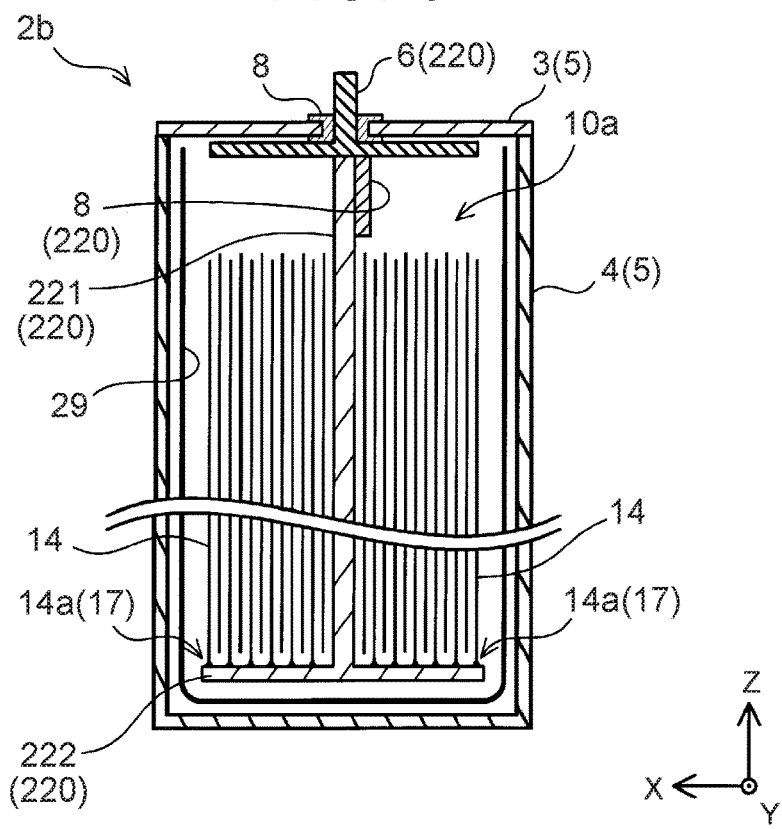
FIG. 8 is a perspective view taken along line VIII-VIII in FIG. 7.
Figure 9:
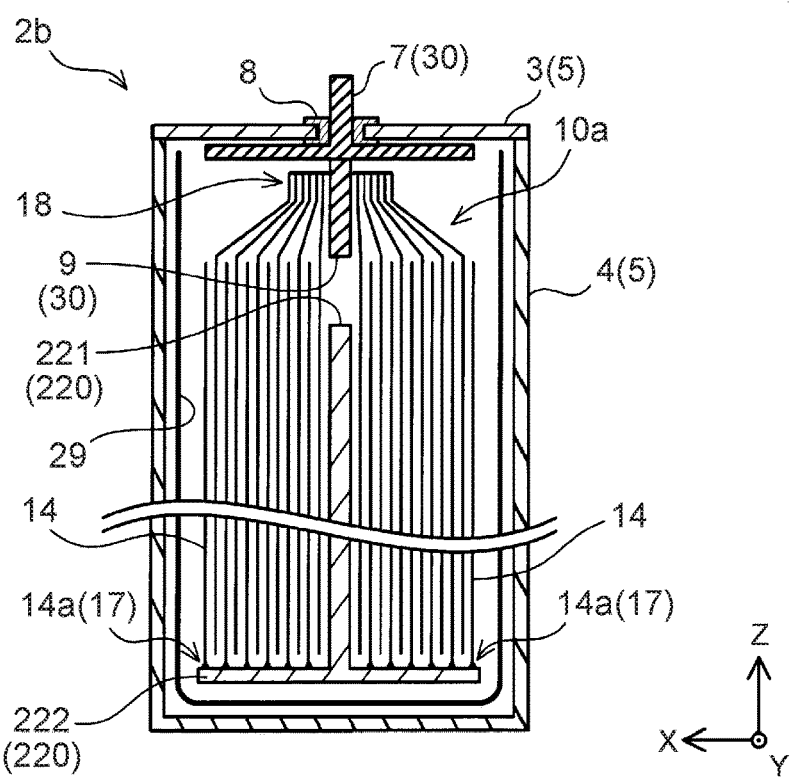
FIG. 9 is a sectional view taken along line IX-IX in FIG. 7.

Next, a battery 2b according to a second example embodiment of the invention will be described with reference to FIGS. 7 to 9. FIG. 7 is an exploded perspective view of the battery 2b, and FIG. 8 is a sectional view taken along line VIII-VIII in FIG. 7. FIG. 9 is a sectional view taken along line IX-IX in FIG. 7. FIGS. 8 and 9 are views of cross-sections of a rolled electrode body 10a, with the separators omitted from these cross-sections. The battery 2b differs from the battery 2 of the first example embodiment in terms of the shape of a positive-electrode electrode terminal 220 and the joining location where the positive-electrode electrode terminal 220 and a positive electrode collector portion 17 are joined. The positive-electrode electrode terminal 220 of the battery 2b is provided with a vertical support plate 221 that is inserted through the center of the rolled electrode body 10a, and a horizontal support plate 222 that is connected to a lower end of this vertical support plate 221. The vertical support plate 221 extends from the case cover 3 toward the bottom surface of the case main body 4 along the rolled electrode body 10a. The horizontal support plate 222 is connected at a right angle to the vertical support plate 221. The rolled electrode body 10a is fixed above the positive-electrode electrode terminal 220. More specifically, only a positive electrode sheet 14 is exposed at a lower portion of the rolled electrode body 10a, and a lower edge 14a of this positive electrode sheet 14 is welded to an upper surface of the horizontal support plate 222. In FIGS. 8 and 9, there are small triangles on the lower edge 14a of the positive electrode sheet 14. These triangles represent weld beads.

At the positive electrode collector portion 17 in the battery 2 of the first example embodiment, the rolled and layered positive electrode sheet 14 is gathered toward the vertical support plate 21 of the positive-electrode electrode terminal 20, overlapped, and welded to the vertical support plate 21. With this kind of structure, the tension on the positive electrode sheet 14 increases farther from the vertical support plate 21, and decreases closer to the vertical support plate 21. Therefore, the positive electrode sheet 14 tends to tear more easily farther away from the vertical support plate 21. In other words, with the battery 2 according to the first example embodiment, the tension on the joint between the vertical support plate 21 and the positive electrode collector portion 17 is uneven. On the other hand, with the battery 2b according to the second example embodiment, the lower edge of each pitch of the rolled positive electrode sheet 14 is welded to the upper surface of the horizontal support plate 222. With the battery 2b of the second example embodiment, tension is applied evenly to the joining location of each pitch of the rolled positive electrode sheet 14. Therefore, the joint strength between the positive electrode sheet 14 (the positive electrode collector portion 17) and the positive-electrode electrode terminal 220 is improved with the battery 2b of the second example embodiment compared to the battery 2 of the first example embodiment. Also, the rolled electrode body 10a is supported riding on the horizontal support plate 222, so the rolled electrode body 10a is stably supported by the horizontal support plate 222.

Next, several modified examples of a positive-electrode electrode terminal having a vertical support plate and a horizontal support plate will be described with reference to FIGS. 10 to 13. In FIGS. 10 to 13 as well, the separates are omitted from the cross-section of the rolled electrode body.

Figure 10A:
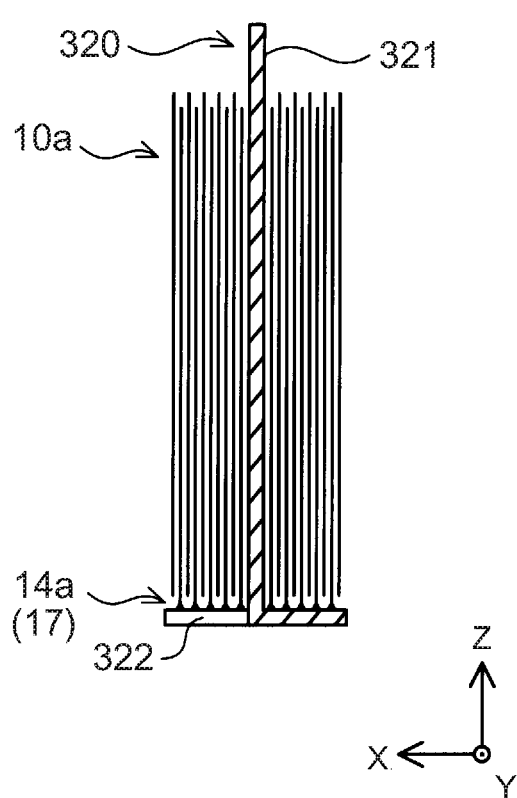
FIG. 10A is a sectional view of a positive-electrode electrode terminal and a rolled electrode body according to a first modified example of the second example embodiment.
Figure 10B:
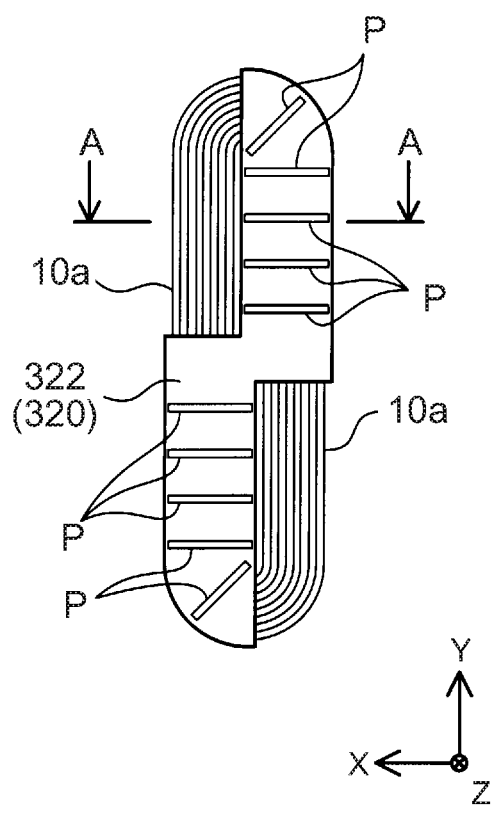
FIG. 10B is a bottom view of the positive-electrode electrode terminal and the rolled electrode body according to the first modified example of the second example embodiment.

FIG. 10A is a sectional view of the rolled electrode body 10a, and a vertical support plate 321 and a horizontal support plate 322 of a positive-electrode electrode terminal 320 according to a first modified example, and FIG. 10B is a bottom view thereof. The cross-section taken along line A-A in FIG. 10B corresponds to the sectional view of FIG. 10A. A connecting portion and an exposed portion of the positive-electrode electrode terminal 320 are omitted from the drawings. In the positive-electrode electrode terminal 20 of this first modified example, the horizontal support plate 322 is lacking the lower right half and the upper left half in FIG. 10B. The battery is able to be made lighter by reducing the area of the horizontal support plate 322. The reference characters P denote the welding points between the horizontal support plate 322 and the lower edge 14a of the positive electrode sheet 14. In this way, the lower edge 14a of the positive electrode sheet 14 is welded at several scattered points, instead of being welded across the entire area that is in contact with the horizontal support plate 322. This is also the same for the second example embodiment shown in FIGS. 8 and 9, as well as the modified examples shown in FIGS. 11 to 13.

Figure 11A:
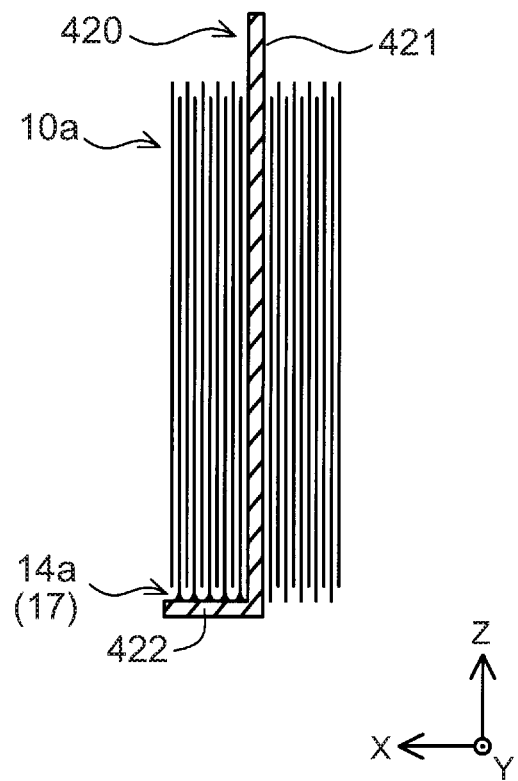
FIG. 11A is a sectional view of a positive-electrode electrode terminal and a rolled electrode body according to a second modified example of the second example embodiment.
Figure 11B:
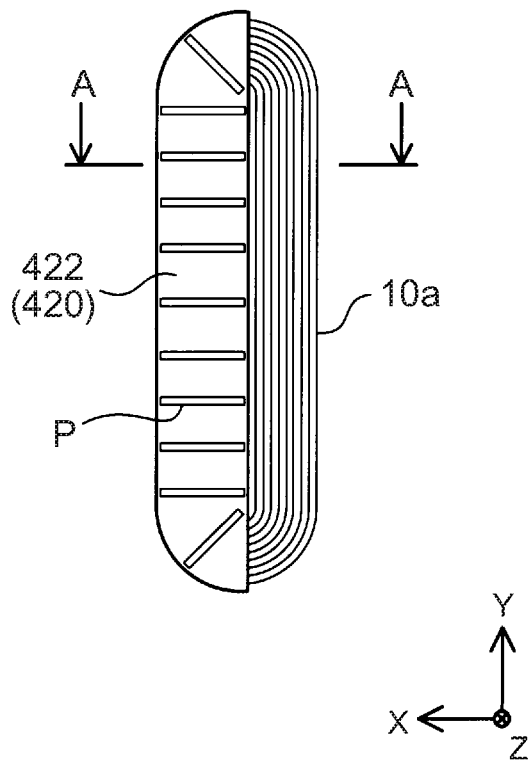
FIG. 11B is a bottom view of the positive-electrode electrode terminal and the rolled electrode body according to the second modified example of the second example embodiment.

FIG. 11A is a sectional view of the rolled electrode body 10a, and a vertical support plate 421 and a horizontal support plate 422 of a positive-electrode electrode terminal 420 according to a second modified example, and FIG. 11B is a bottom view thereof. The cross-section taken along line A-A in FIG. 11B corresponds to the sectional view of FIG. 11A. A connecting portion and an exposed portion of the positive-electrode electrode terminal 420 are omitted from the drawings. In the positive-electrode electrode terminal 420 of this first second example, the horizontal support plate 422 is present in only the left half of FIG. 11B. More specifically, the horizontal support plate 422 is such that the lower end of the vertical support plate 421 is bent. With the positive-electrode electrode terminal 420 of this modified example, the vertical support plate 421 and the horizontal support plate 422 are formed by bending an originally single metal plate. The vertical support plate 421 and the horizontal support plate 422 of this positive-electrode electrode terminal 420 are able to be manufactured at a low cost from a single metal plate.

Figure 12A:
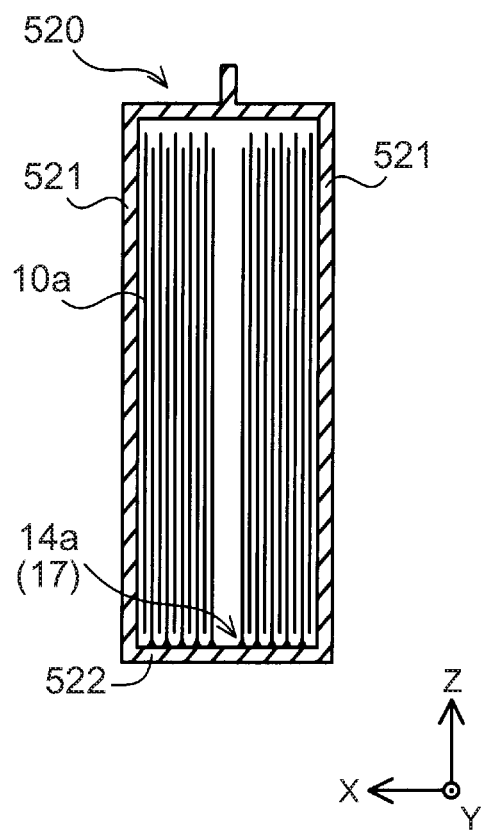
FIG. 12A is a sectional view of a positive-electrode electrode terminal and a rolled electrode body according to a third modified example of the second example embodiment.
Figure 12B:
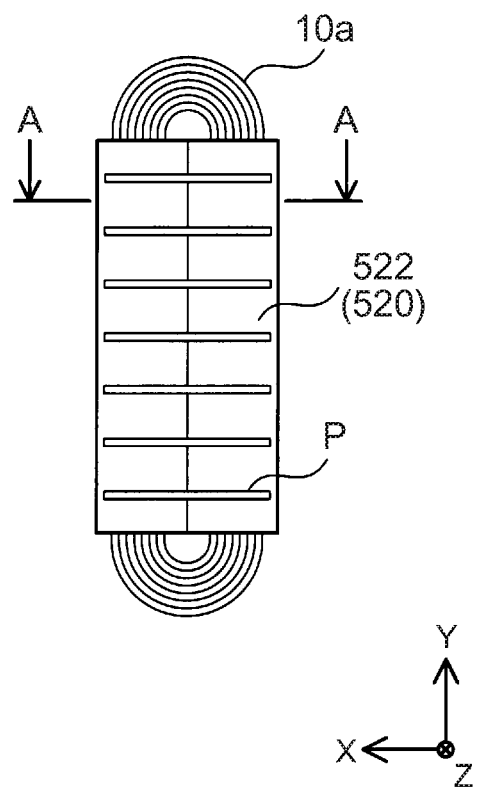
FIG. 12B is a bottom view of the positive-electrode electrode terminal and the rolled electrode body according to the third modified example of the second example embodiment.

FIG. 12A is a sectional view of the rolled electrode body 10a, and vertical support plates 521 and a horizontal support plate 522 of a positive-electrode electrode terminal 520 according to a third modified example, and FIG. 12B is a bottom view thereof. The cross-section taken along line A-A in FIG. 12B corresponds to the sectional view of FIG. 12A. A connecting portion and an exposed portion of the positive-electrode electrode terminal 520 are omitted from the drawings. The positive-electrode electrode terminal described thus far has been provided with a vertical support plate that passes through the center of the rolled electrode body. However, with the positive-electrode electrode terminal 520 of the third modified example, a pair of vertical support plates 521 extend from up to down along the outside of the rolled electrode body 10a. In other words, the pair of vertical support plates 521 extend toward the bottom surface of the case main body, sandwiching the rolled electrode body 10a from both sides. The pair of vertical support plates 521 sandwich the rolled electrode body 10a, such that in this modified example, the rolled electrode body 10a is able to be even more securely supported. The horizontal support plate 522 is formed by the bent lower ends of the pair of vertical support plates 521, which are joined at the center in FIG. 12B.

Figure 13A:
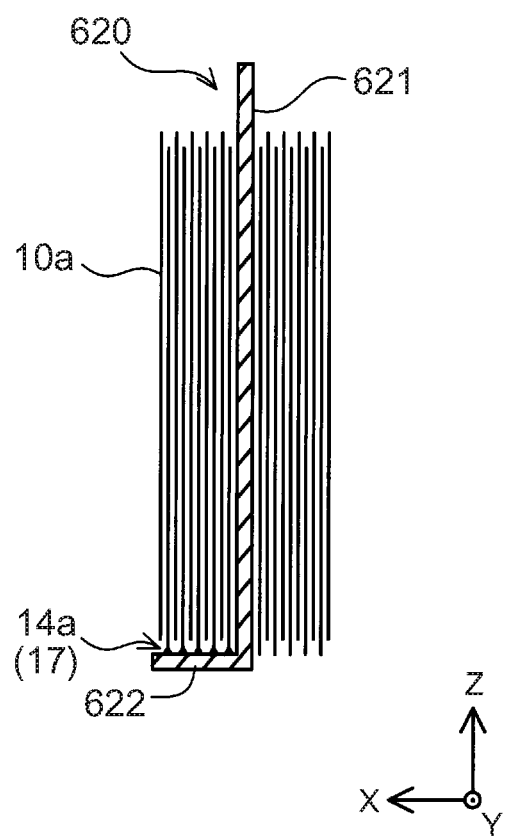
FIG. 13A is a sectional view of a positive-electrode electrode terminal and a rolled electrode body according to a fourth modified example of the second example embodiment.
Figure 13B:
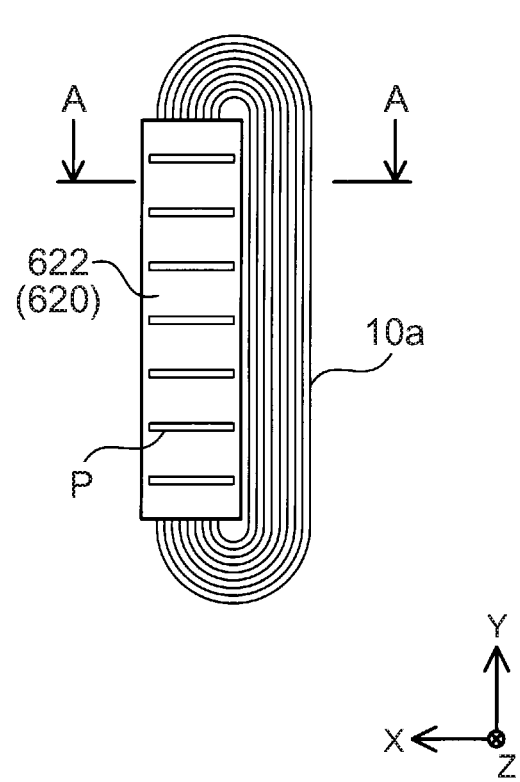
FIG. 13B is a bottom view of the positive-electrode electrode terminal and the rolled electrode body according to the fourth modified example of the second example embodiment.

FIG. 13A is a sectional view of the rolled electrode body 10a, and a vertical support plate 621 and a horizontal support plate 622 of a positive-electrode electrode terminal 620 according to a fourth modified example, and FIG. 13B is a bottom view thereof. The cross-section taken along line A-A in FIG. 13B corresponds to the sectional view of FIG. 13A. A connecting portion and an exposed portion of the positive-electrode electrode terminal 620 are omitted from the drawings. This modified example corresponds to a case in which the length of the horizontal support plate in the long direction in the second example embodiment (FIG. 11) has been shortened. In other words, the horizontal support plate 622 of the positive-electrode electrode terminal 620 of the fourth modified example covers only one side of a portion where the sheet extends linearly on the lower surface of the rolled electrode body 10*a*. More specifically, the structure of the fourth modified example is as described below. The rolled electrode body 1*a* is rolled flat and has a portion where the positive electrode sheet, the negative electrode sheet, and the separators extend linearly, and a portion where the positive electrode sheet, the negative electrode sheet, and the separators are curved, when viewed from the direction of the rolling axis J. Also, the horizontal support plate 622 is connected to only one side of the portion that extends linearly, with the long axis of the flat rolled electrode body 10*a* as the boundary, when viewed from the direction of the rolling axis J. This modified example is advantageous in that the horizontal support plate is further reduced, which enables the battery to be lighter.

Figure 14:
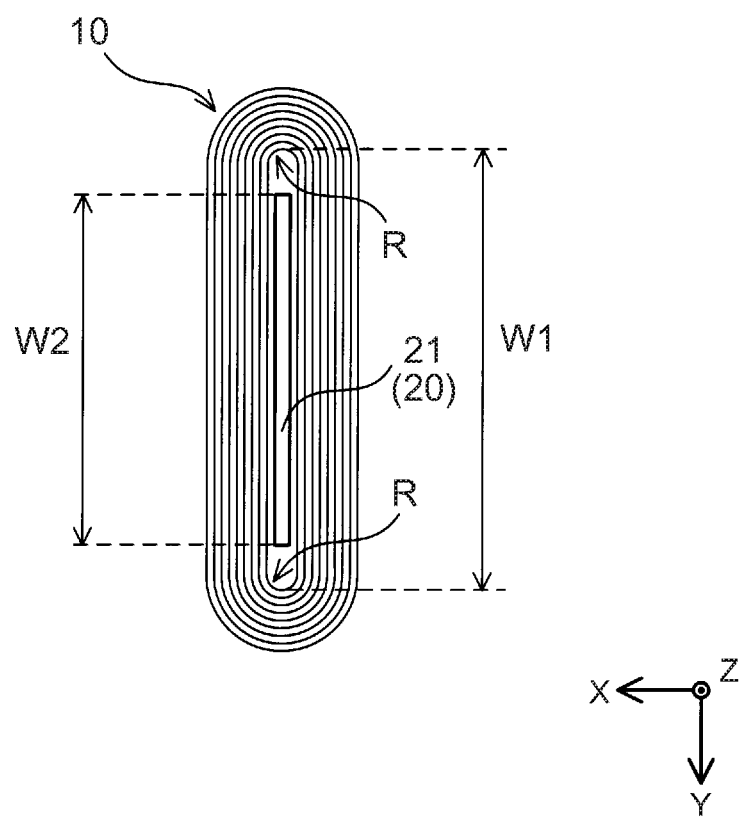
FIG. 14 is a view illustrating the relationship between a length in the long direction of the vertical support plate of the positive-electrode electrode terminal and a length in the long direction of a center hole in the rolled electrode body.

With the battery 2*b* of the second example embodiment and other modified examples excluding the modified example shown in FIG. 12, the vertical support plate passes through the center of the rolled electrode body. The relationship between a length W2 in the long direction (the Y axis direction) of the vertical support plate 21, and a length W1 in the long direction of a center hole in the rolled electrode body 10 will now be described with reference to FIG. 14. The rolled electrode body 10 is made by rolling a layered body formed by the positive electrode, the negative electrode, and the separators, in a flat shape around a plate that serves as a core. The core is removed after the layered body has been rolled in a flat shape. A secondary battery having a rectangular flat battery case may receive pressure on a flat surface of the case main body. That is, the flat case main body may be squeezed resulting in compression force being applied to the rolled electrode body 10 inside. If this occurs, the curved portions R at both ends in the long direction of the long thin center hole in the rolled electrode body will be crushed. At this time, the positive electrode sheet and the like may become bent at the curved portions R. Here, the vertical support plate 21 that is inserted into the long narrow center hole of the rolled electrode body 10 achieves an effect of preventing the sheet from bending at the curved portions R. To effectively prevent the sheet from bending at the curved portions R, the length W2 in the long direction of the vertical support plate 21 that is inserted through the center hole may be set with respect to the length W1 in the long direction of the center hole in the rolled electrode body 10, to satisfy the relationship W2>(W1/2). The thickness of the vertical support plate is set according to the flexibility of the positive electrode sheet and the like.

Figure 15:
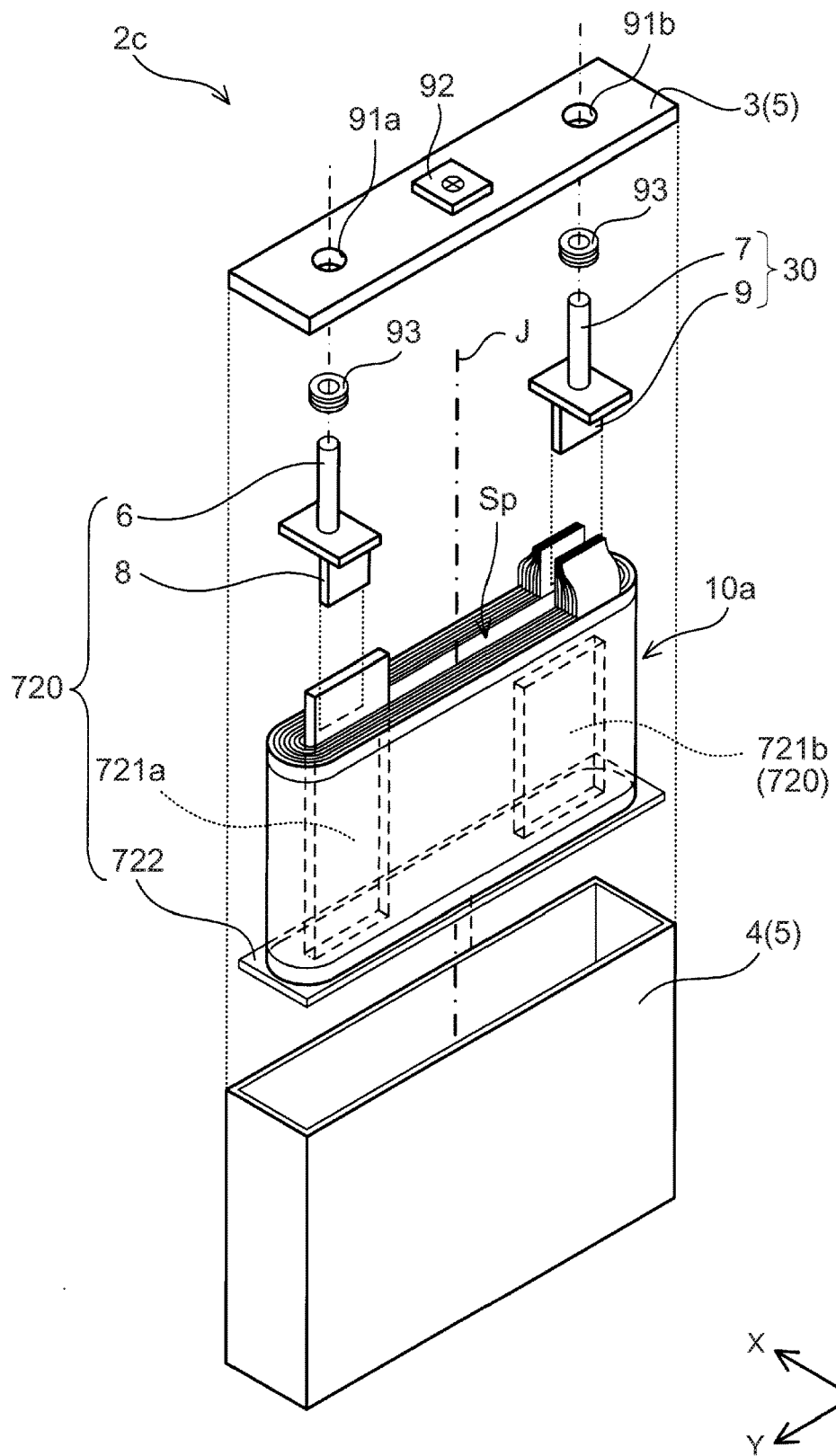
FIG. 15 is an exploded perspective view illustrating yet another modified example.

Next, yet another modified example of the positive-electrode electrode terminal will be described with reference to FIG. 15. With a battery 2*c* in FIG. 15, a positive-electrode electrode terminal 720 includes two vertical support plates 721*a* and 721*b*, and these two vertical support plates 721*a* and 721*b* are connected to a single horizontal support plate 722. One of the vertical support plates 721*a* is connected to the connecting portion 8. The other vertical support plate 721*b* is provided to prevent the curved portions R of the rolled electrode body described earlier from being crushed. Here, a space Sp is provided between the vertical support plate 721*a* and the vertical support plate 721*b*. This space Sp leads gas to the safety valve 92 when gas is produced inside the rolled electrode body 10*a*. The battery 2*c* of this modified example shown in FIG. 15 prevents the curved portions R (see FIG. 14) of the flat rolled electrode body 10 from being crushed, as well as leads gas produced inside the rolled electrode body 10*a* to the safety valve when such gas is produced, thereby enabling the gas to be smoothly released.

Points to keep in mind regarding the technology described in the example embodiments will now be described. In all of the example embodiments and the modified examples thereof, the rolled electrode body is arranged in a vertical orientation (i.e., vertically) such that the positive electrode collector portion is close to the lower surface of the case main body. The rolled electrode body may also be housed in the case main body such that the positive electrode collector portion is close to the case cover 3, and the negative electrode collector portion is close to the bottom surface of the case main body 4. In the example embodiments, the positive electrode collector portion 17 that is positioned on the bottom side of the case main body 4 corresponds to one example of a collector portion that is positioned on a lower side of the rolled electrode body 10. The negative electrode collector portion 18 that is positioned on the side with the case cover 3 corresponds to one example of a collector portion that is positioned on an upper side of the rolled electrode body 10. Also, the positive-electrode electrode terminal 20 corresponds to one example of a "second electrode terminal", and the negative-electrode electrode terminal 30 corresponds to one example of a "first electrode terminal". In the technology described in this specification, the positive electrode (i.e., the positive-electrode electrode terminal) and the negative electrode (i.e., the negative-electrode electrode terminal) may be reversed, as described above.

In the battery of all of the example embodiments and modified examples thereof, excluding the modified example shown in FIG. 12, the positive-electrode electrode terminal (i.e., the second electrode terminal) passes through the inside of the rolled electrode body, and is joined to a lower portion (i.e., a portion close to the bottom surface of the case) of the rolled electrode body. In the modified example in FIG. 12, the two vertical support plates 521 sandwich the rolled electrode body, and are joined to a lower portion (i.e., a portion close to the bottom surface of the case) of the rolled electrode body. With this kind of structure, the rolled electrode body is securely supported.

In the secondary battery of the example embodiments, the battery case 5 (i.e., the case main body 4 and the case cover 3) is made of a conductive metal, and the rolled electrode body 10 is insulated from the battery case 5 by the insulting sheet 29 and the insulating gasket 93. The battery case (i.e., the case main body and the case cover) is also preferably made of insulating material.

Instead of the protruding portions 12*b* of the negative electrode sheet 12, a plurality of strip-like tabs may be adhered to a negative electrode sheet that does not have protruding portions.

Heretofore, specific examples of the invention have been described in detail, but these are merely examples. The invention is not limited to these examples. The invention also includes various modifications of the specific examples described above. Also, the technical elements illustrated in the specification and the drawings display technical utility both alone and in various combinations. Further, the technology illustrated in the specification and the drawings simultaneously achieves a plurality of objects, and has technical utility by simply achieving one of these objects.

What is claimed is:

1. A secondary battery comprising:
a rolled electrode body that includes a positive electrode sheet, a negative electrode sheet, a separator, a positive electrode collector portion, and a negative electrode collector portion,
   the positive electrode sheet and the negative electrode sheet being rolled with the separator sandwiched therebetween,
   the positive electrode collector portion being formed on one end in a direction of a rolling axis, and the negative electrode collector portion being formed on the other end in the direction of the rolling axis;
a case main body that is rectangular shaped, within which the rolled electrode body is housed in an orientation in which the rolling axis is orthogonal to a bottom surface of the case main body;
a case cover that closes off an upper opening of the case main body;
a first electrode terminal that is fixed to the case cover, one end of the first electrode terminal being exposed to an outside of the case main body, and the other end of the first electrode terminal being connected to a first collector portion, the first collector portion being one of the positive electrode collector portion and the negative electrode collector portion, whichever is positioned on an upper side of the rolled electrode body inside the case main body;
a second electrode terminal that is fixed, together with the first electrode terminal, to the case cover, one end of the second electrode terminal being exposed to the outside of the case main body, and the other end of the second electrode terminal being connected to a second collector portion, the second collector portion being one of the positive electrode collector portion and the negative electrode collector portion, whichever is positioned on a lower side of the rolled electrode body,
   the first electrode terminal and the second electrode terminal supporting the rolled electrode body wherein
the second electrode terminal includes a vertical support plate and a horizontal support plate;
the vertical support plate extends toward the bottom surface of the case main body along the rolled electrode body;
the horizontal support plate is connected to a lower end of the vertical support plate;
the second collector portion is fixed on top of the horizontal support plate; and
in the second collector portion, an edge of one sheet, from among the positive electrode sheet and the negative electrode sheet, is exposed, and the edge of each pitch of the one sheet is independently joined to the horizontal support plate at multiple scattered points,
wherein the vertical support plate is inserted through an inside of the rolled electrode body,
the vertical support plate passes through a center hole of the rolled electrode body, and
a length of the center hole in a long direction of the vertical support plate is longer than a half length of the vertical support plate in the long direction.

2. The secondary battery according to claim 1, wherein the vertical support plate is one of a pair of vertical support plates, and
the pair of the vertical support plates extend toward the bottom surface of the case main body, sandwiching the rolled electrode body from both sides.

3. The secondary battery according to claim 1, wherein the rolled electrode body is rolled flat having a portion where the positive electrode sheet, the negative electrode sheet, and the separator extend linearly, and a portion where the positive electrode sheet, the negative electrode sheet, and the separator are curved, when viewed from the rolling axis direction; and
the horizontal support plate is connected to only one side of the portion that extends linearly, with an axis of the flat rolled electrode body through the rolling axis, as a boundary, when viewed from the rolling axis direction, the axis of the flat rolled electrode body is perpendicular to the rolling axis and parallel to the portion that extends linearly.

4. The secondary battery according to claim 1 wherein the case main body and the case cover are insulating bodies, or the case main body and the case cover are insulated from the rolled electrode body.

* * * * *